United States Patent [19]

Primbs, Jr.

[11] 4,420,755
[45] Dec. 13, 1983

[54] TELEMETRY LOAD LINK ASSEMBLY

[75] Inventor: Robert J. Primbs, Jr., Layton, Utah

[73] Assignee: The United States of America as represented by the Secretary of the Air Force, Washington, D.C.

[21] Appl. No.: 295,034

[22] Filed: Aug. 21, 1981

[51] Int. Cl.³ .................... G08C 19/04; B64D 1/00
[52] U.S. Cl. .................... 340/870.38; 73/802; 73/862.57; 212/155; 258/1.2; 244/137 R; 340/685; 340/668; 340/870.28
[58] Field of Search ............. 340/870.18, 870.38, 340/685, 665, 668, 825.06, 870.01, 870.28; 73/802, 862.39, 862.57, 862.56; 244/137 R; 212/153, 155; 258/1.2

[56] References Cited

U.S. PATENT DOCUMENTS

| | | | |
|---|---|---|---|
| 2,505,707 | 4/1950 | du Pont | 258/1.2 |
| 2,520,923 | 9/1950 | Franzel et al. | 73/862.57 |
| 3,207,480 | 9/1965 | Fulton, Jr. | 258/1.2 |
| 3,336,005 | 8/1967 | Dickerman | 258/1.2 |
| 3,378,828 | 4/1968 | Stark | 340/870.38 |
| 3,555,894 | 1/1971 | Bratkowski | 340/870.38 |
| 3,627,232 | 12/1971 | Ramsay | 244/1 R |
| 3,631,537 | 12/1971 | Zibolski et al. | 340/870.38 |
| 3,815,116 | 6/1974 | Fink | 340/685 |
| 3,828,339 | 8/1974 | Schedrovitsky et al. | 340/267 C |
| 4,048,942 | 9/1977 | Cotton et al. | 114/253 |
| 4,124,181 | 11/1978 | Kolwey | 244/137 R |

Primary Examiner—James J. Groody
Attorney, Agent, or Firm—Donald J. Singer; Stanton E. Collier

[57] ABSTRACT

A mid-way recovery system having an aircraft with a winch and cable system for recovering parachute descending objects wherein a telemetry load link system monitors the strain placed upon a cable by having a telemetry load link assembly connected into the cable so strain data is transmitted to a radio receiver on board the aircraft for monitoring the strain placed upon the cable.

3 Claims, 3 Drawing Figures

TELEMETRY LOAD LINK ASSEMBLY

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

The present invention relates to a mid-air recovery system and, more particularly, to a telemetry load link assembly that measures strain in a load cable between an aircraft and a recovered object and transmits a strain data signal to the aircraft for the purpose of monitoring strain and thus controlling the rate of winching on the cable.

2. Description of the Prior Art

One prior apparatus for measuring strain is a solid link upon which strain and temperature compensation gauges are firmly affixed. The gauges are electrically connected to the monitoring equipment by wires. This apparatus presented several problems for the mid-air recovery aircraft, especially a helicopter.

As the object to be recovered descends by parachute, such as a satellite package or a remotely piloted vehicle (RPV), the helicopter hooks the parachute by appropriate maneuvers. Because of differences in velocities, distances, and weight, the load cable, having the load link connected therein, is unreeled from a winch drum of a hydraulic winch located in the rear of the helicopter. As the cable is unreeled, a brake is applied to the drum to stop the drum. After the drum stops, the drum is reversed in direction so that the cable is wound on to the drum. During this process, great stresses are placed on the load cable which could cause it to separate and snap. The disadvantages of this apparatus is that the loose load cable along with the electrical wires can easily be entangled within the moving blades of the helicopter causing great damage; further, the electrical wires by themselves may break and also be caught within the blades. The electrical wires can also be damaged during payout since they must be attached to the load cable on the payout drum.

SUMMARY OF THE INVENTION

The present invention is directed to a mid-air recovery system telemetry load link assembly.

The load link assembly is composed of a load link, a load sensing link, and a telemetry load link. The load cable has a lower cable and an upper cable with the telemetry load link attached therebetween. A hooking means is attached to the lower end of the lower cable and the upper end of the upper cable is attached to the winch drum. The lower cable is attached by a loop guide to the load link. An upper end of the load link is attached to a lower end of the load sensing link. The upper end of the telemetry load link is attached to a winch cable loop guide from which the upper cable is also attached. The upper cable is also attached to the winch drum in the helicopter.

The load sensing link has strain measuring gauges mounted within it and an electrical output for the strain data.

The telemetry load link has a telemetry means including a transmitter and a power supply within a housing. The transmitter receives strain data from the load sensing link and transmits this data by RF signal to a receiver. A monitor is connected to the receiver located in a recovery aircraft such as the helicopter. The data received is converted by a strain monitor to a form appropriate for recording and/or monitoring by an operator who can control the rate of the winch.

It is therefore an object of this invention to provide a load link assembly having a telemetry capability.

Another object is mid-air recovery system having a telemetry load link assembly for controlling the winch speed.

Other objects and advantages of the invention will become apparent from the following detailed description of the invention when considered in conjunction with the accompanying drawings and claims.

DESCRIPTION OF THE PREFERRED EMBODIMENT

Figure 1:
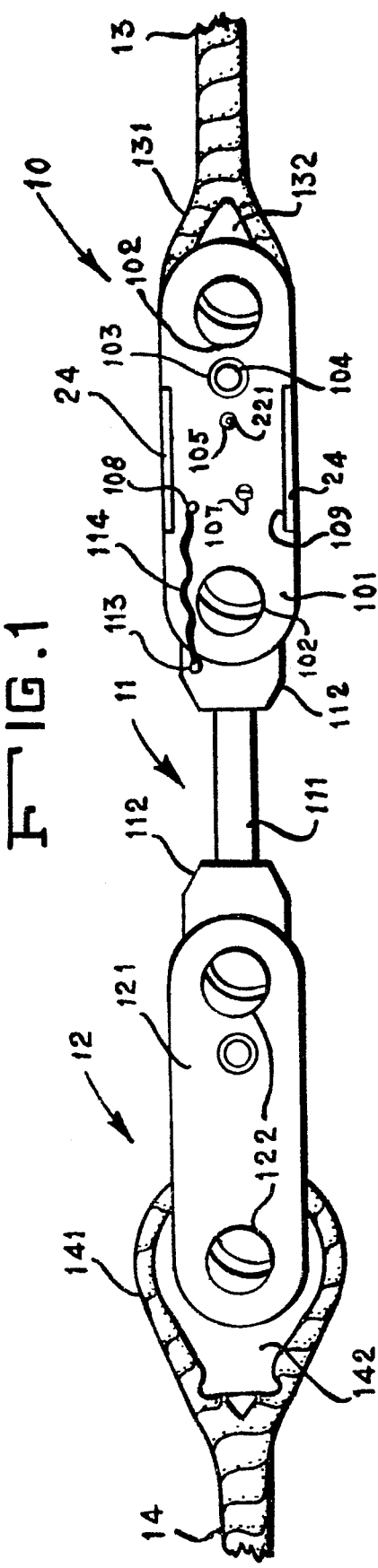
FIG. 1 is a side view of the load link, load sensing link, and the telemetry load link connected together between an upper and lower cable.

Referring to FIG. 1, this illustrates a telemetry load link assembly made up of a load link 12, a load sensing link 11, and a telemetry load link 10 connected between a lower cable 14 and an upper cable 13. A hooking means, not shown, is attached at the other end of lower cable 14 and a winch drum, not shown, is connected to the other end of upper cable 13. Cables 14 and 13 are made of steel or other suitably strong material. A link end of cable 14 forms a loop 141 about a loop guide 142 such as one finds in the standard Air Force Loop Assembly. Loop guide 142 is rotatably secured to load link 12 by bolting means 122. Load link 12 has two link plates 121, one shown. These plates are made of metal such as steel.

Load sensing link 11 is composed of lug ends 112 and a connecting element 111 being an integral part of lug ends 112. The strain measuring gauges are installed within connecting element 111 and output strain data at a data output 113. In particular, load sensing link 11 can be Strainsert Corp. Model TLM 20Kip, trademarked as Load Sensing Tension Link. Lug end 112 without data output 113 is rotatably secured to load link 12 by bolting means 122. Lug end 112 with data output 113 is rotatably secured to telemetry load link 10 by bolting means 102.

Figure 2:
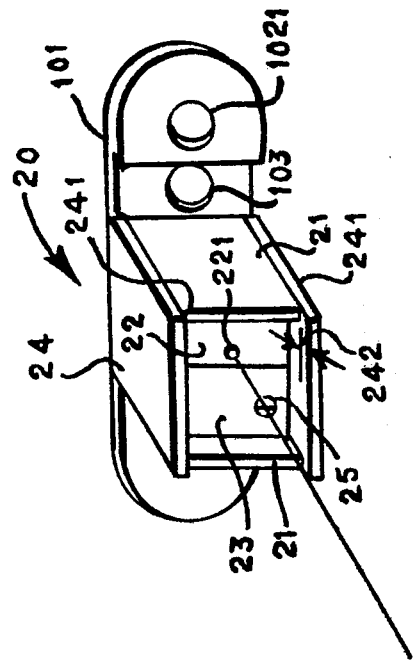
FIG. 2 is an isometric side view of the telemetry load link with one side removed.

Referring to FIGS. 1 and 2, telemetry load link 10 is composed of a housing 20, bolting means 102, a stabilizing pin 104, a power supply 23, and a transmitter 22.

Housing 20 is shaped essentially like a rectangular box composed of mounting plates 101, a front and a back 21, and a top and a bottom 24. Mounting plates 101 have arms that extend beyond the rectangular box for purposes of attaching other devices to be mentioned hereinafter. These sides are constructed of steel or a similar material.

Mounting plate 101 shown in FIG. 1 is a part of telemetry load link 10. Mounting plates 101 have bolt holes such as 1021, shown in FIG. 2, through which bolting means 102 rotatably holds load sensing link 11 and winch cable loop guide 132. A stabilizing pin hole 103, through which a stabilizing pin 104 is positioned, is located in both plates 101 and proximal to a winch cable loop 131 so that stabilizing pin 104 pinches against winch cable loop 131 to stop free oscillations between lower cable 14 and upper cable 13 about the telemetry load link assembly. Additional holes are machined in mounting plate 101, shown in FIG. 1, to accommodate a telemetry package.

Figure 3:
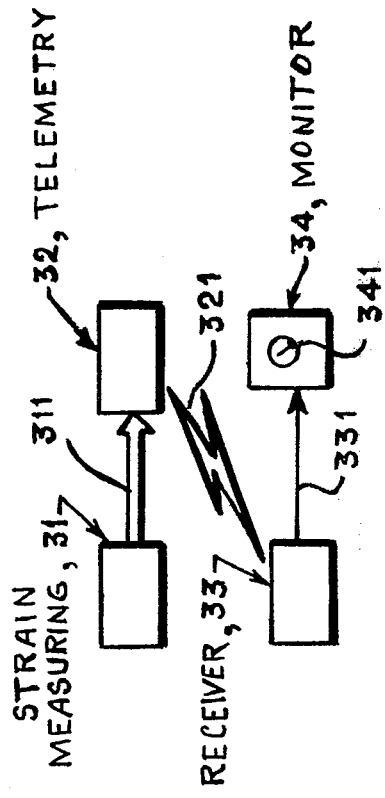
FIG. 3 is a functional block diagram of the electronic system of the telemetry load link assembly.

Referring to FIG. 3, strain measuring means 31 which is mounted in connecting element 111 sends strain data 311 via data line 114 through data port 108 to telemetry means 32 mounted in housing 20. Telemetry means 32 is composed of transmitter 22 and power supply 23. Transmitter 22 sends an RF strain signal 321 to receiver 33 which can be mounted in an aircraft. Receiver 33 outputs a strain signal 331 to a strain monitor 34 which outputs transformer strain data to an output device such as meter 341 from which an operator can read actual strain placed on the cable.

A power switch 25 is utilized to apply power from a power supply 23 to transmitter 22. Switch 25 is manipulated through a power port 107.

An antenna 221 connected to transmitter 22 communicates to the outside of housing 20 by an antenna port 105. Antenna 221 is flexible since it must also be wound onto the drum.

Both mounting plates 101 have rectangular grooves 109 on the top and bottom edges so that tabs 241 on top and bottom 24 fit closely within grooves 109 to support a telemetry means 32 within mounting plates 101 without further attaching means.

Housing 20 has top and bottom 24, and front and back 21 fixedly attached to each other to form a rectangular box for fixedly holding telemetry means 32 shown in FIG. 2 when mounting plate 101 shown in FIG. 1 is removed. Front and back 21 are shorter in depth than top and bottom 24 by two thicknesses of mounting plate 101. One half of this thickness is shown as a distance 242 in FIG. 2. When all the sides are together, a compartment is formed in housing 20 to hold power supply 23 and transmitter 22, shown in FIG. 2. Power supply 23 outputs a voltage of approximately 9 VDC. An example transmitter is an ARK Corp FM Transmitter Model T-202, trademarked as a Wireless Link.

In operation, the telemetry load link assembly is connected between lower and upper cable 14 and 13. Before the mission, power supply 23 is turned on. Receiver 33 and monitor 34 are on board the aircraft. As the object descends by parachute, the aircraft maneuvers to snag the parachute by hooking means on the end of lower cable 14. When snagged, the cable rapidly unwinds from the drum in the aircraft. An operator applies a brake to the winch while strain data is received by a receiver 33 which outputs strain signal 331 to monitor 24. The winch is eventually stopped and the direction reversed so that the cable is reeled onto the drum. Monitor 34 outputs transformed strain data 341 which is continually monitored during cable payout and rewinding to insure that strain placed on the cable does not exceed specifications.

It is to be noted that although there have been described the fundamental and unique features of my invention as applied to a preferred embodiment, various other embodiments, variations, adaptations, substitutions, additions, omissions, and the like may occur to, and can be made by, those of ordinary skill in the art, without departing from the spirit of the invention.

What is claimed is:

1. An improved mid-air recovery system having an aircraft with a winch and cable, said cable having a hook for capturing a parachute descending object, said improved mid-air recovery system comprising:

a telemetry load link assembly attached to said cable to measure and to transmit strain in said cable while said object is attached to said cable on said aircraft, said telemetry load link assembly having a load link rotatably connected to said cable, a load sensing link rotatably connected to said load link, and a telemetry load link rotatably connected between said load sensing link and said cable, said telemetry load link having a transmitter for receiving strain data from said load sensing link and for transmitting an RF strain signal, a housing for fixedly holding said transmitter and for holding a power supply for said transmitter in said telemetry load link, bolting means for connecting said telemetry load link to said load sensing link and said cable, a loop guide for connecting said cable to said bolting means, and a stabilizing pin for damping out oscillations between said telemetry load link and said cable;

a receiver located in said aircraft to receive said RF strain signal, said receiver outputting a strain signal; and strain monitor means for receiving said strain signal from said receiver and for outputting transformed strain data to be interpreted by a winch control for controlling a rate of winching of said cable that has hooked thereon said object to be recovered.

2. An improved mid-air recovery system as defined in claim 1, wherein said housing comprises mounting plates, a top, bottom, a front, and a back, said housing forming a rectangular compartment for fixedly holding said power supply and said transmitter, said mounting plates having arms for bolting holes and stabilizing pin holes for attaching said loop guide and said load sensing link, said plates having holes communicating to said compartment for a data line, a power control, and an antenna.

3. An improved mid-air recovery system as defined in claim 1, wherein said transmitter is an FM radio transmitter.

* * * * *